United States Patent [19]

Van Natta

[11] 4,111,673
[45] Sep. 5, 1978

[54] MINERAL FIBERIZING WHEEL
[75] Inventor: Cletus L. Van Natta, Red Wing, Minn.
[73] Assignee: Conwed Corporation, St. Paul, Minn.
[21] Appl. No.: 844,117
[22] Filed: Oct. 17, 1977

Related U.S. Application Data
[63] Continuation-in-part of Ser. No. 696,424, Jun. 15, 1976, abandoned.
[51] Int. Cl.$^2$ .............................................. C03D 37/04
[52] U.S. Cl. ............................................ 65/6; 65/14; 65/15; 65/374 RM; 264/8
[58] Field of Search ............................... 264/8; 65/6–8, 65/14–16, 374 RM, 26

[56] References Cited
U.S. PATENT DOCUMENTS

| 1,308,820 | 7/1919 | Tillger et al. | 65/26 |
| 2,201,049 | 5/1940 | Moore | 65/26 |
| 2,587,722 | 3/1952 | Garratt et al. | 65/26 X |
| 2,731,670 | 1/1956 | Downey | 65/26 X |

FOREIGN PATENT DOCUMENTS 544,512  4/1942  United Kingdom ........................ 65/26

OTHER PUBLICATIONS

Metals Handbook, Eighth edition, vol. 2, Am. Soc. for Metals, pp. 146–166.

Primary Examiner—Robert L. Lindsay, Jr.
Attorney, Agent, or Firm—Eyre, Mann, Lucas & Just

[57] ABSTRACT

A wheel for use in mineral fiberizing processes of the type in which a stream of molten mineral matter is distributed from a rotating wheel is disclosed. The wheel according to the present invention has at least a portion of its surface which contacts the molten mineral matter liquid nitrided to increase wheel life and decrease the frequency of cleaning thereof.

3 Claims, 1 Drawing Figure

U.S. Patent  Sept. 5, 1978  4,111,673
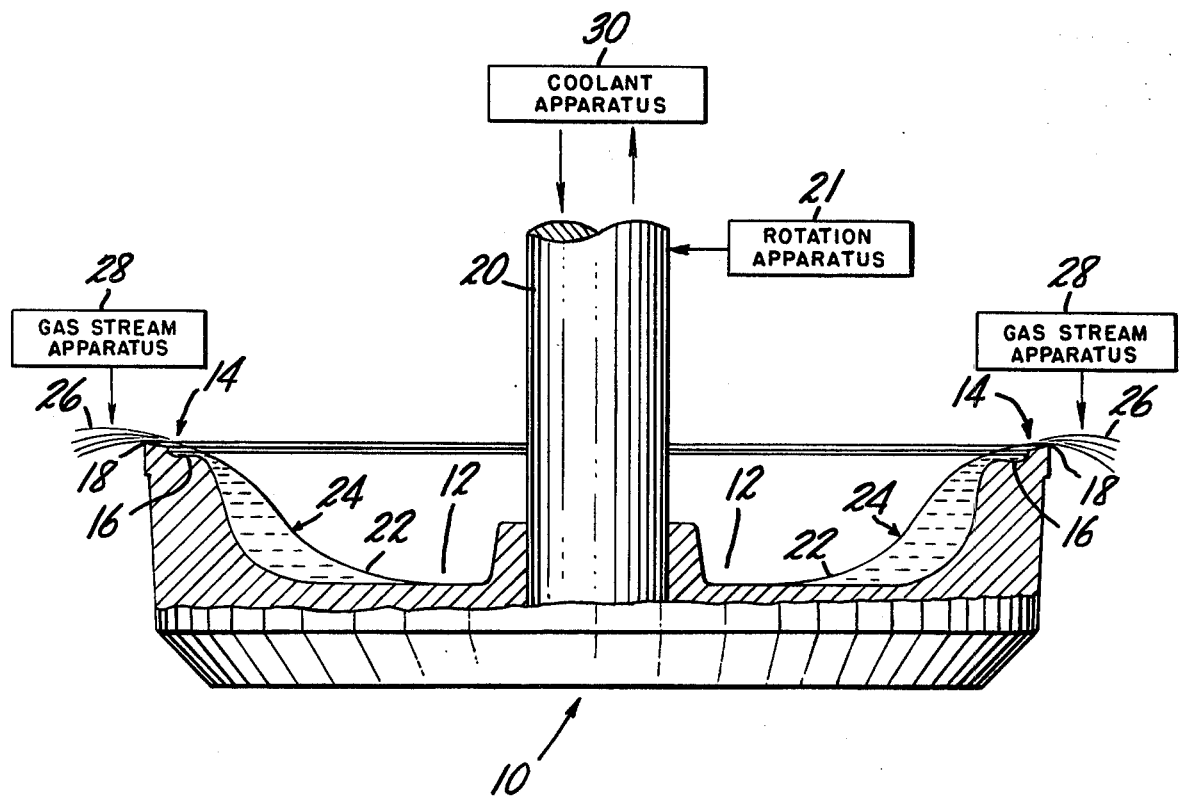

MINERAL FIBERIZING WHEEL

This application is a continuation-in-part of patent application Ser. No. 696,424, filed June 15, 1976 now abandoned.

BACKGROUND OF THE INVENTION

1. Field of the Invention

The present invention relates to processes for making mineral fibers which employ a rotating fiberizing wheel.

2. Description of the Prior Art

U.S. Pat. No. 2,587,710 describes a process for making mineral fibers in which molten mineral is deposited on a rotating wheel. The molten mineral is discharged from the rotating wheel surface tangentially in streams which are contacted by streams of a gaseous fluid such that the direction of the molten streams is suddenly and violently changed. This results in fiberizing of the molten mineral. Known wheels, even those with surfaces of cold rolled steel having a stainless steel facing shrunk thereon, accumulate build-ups of molten slag thereon and normally require cleaning every 20 minutes. The life expectancy of such wheels is only about 1 week.

The present invention reduces frequency of cleaning of fiberizing wheels, increases their life and increases process yield, and obviates the need for a stainless steel or other metal coating.

SUMMARY OF THE INVENTION

The present invention is embodied in and carried out by a mineral fiberizing wheel having at least a portion of its surface which contacts the molten mineral matter liquid nitrided. The present invention is a significant technological advance in that the frequency of cleaning of the fiberizing wheel according to the invention of build-ups of molten mineral matter is reduced by approximately 300% and by as much as 600% over known wheels and in that the life expectancy of fiberizing wheels according to the invention are increased by approximately 300% over known wheels.

BRIEF DESCRIPTION OF THE DRAWING

These and other aspects of the present invention will be more apparent from the following detailed description of the invention when considered in conjunction with the accompanying drawing in which a portion of a fiberizing wheel is diagrammatically shown.

DESCRIPTION OF THE PREFERRED EMBODIMENT

A fiberizing wheel 10 of the type disclosed in the aforementioned U.S. Patent is shown. Wheel 10, made of suitable metal, comprises a concave surface center portion 12 surrounded by a stepped portion 14 having groove 16 and wall 18. Coolant fluid is circulated in the interior of the wheel in known manner and enters and leaves the interior of the wheel through conduit 20 in known manner. Other details of the wheel will be apparent to those skilled in the art.

In operation, wheel 10 is rotated in known manner by apparatus 21 and molten mineral matter 22 is deposited on the concave portion of the wheel. Rotation of the wheel causes the molten mineral matter to move towards the periphery of the wheel, as shown by the increased amount of matter referenced by 24. Rotation of wheel 10 causes the matter to rise up to and over stepped portion 14 and to be discharged from the wheel tangentially in the form of streams 26. Streams 26 are contacted with streams of gaseous fluid released by apparatus 28 which suddenly and violently change the direction of the molten streams 26, thereby fiberizing the mineral (not shown). Means 21 for rotating the wheel 10, means 28 for releasing streams of gaseous fluid, and means 30 for supplying and withdrawing coolant will be apparent to those skilled in the art.

According to the present invention, the metal concave surface portion 12 and the metal stepped portion 18 are subjected to a liquid nitriding process, preferably using a molten salt as the nitriding agent. One such liquid nitriding process is known by the Trademark TUFFTRIDE. The wheel portions 12 and 14 may suitably be of cold rolled steel and may have a stainless steel facing shrunk thereon if desired.

The liquid nitriding process of the present invention is a very well known process to those of ordinary skill in the art. The process is commonly referred to as nitriding and this term is similarly well known to those of ordinary skill in the art. Nitriding is fully described at pages 146–153 of *Metals Handbook*, Eighth Edition, Volume 2 published by American Society for Metals, which is hereby incorporated by reference. It may be done by liquid or gas and involves the case hardening of the metal by treatment with a nitrogen, either a nitrogenous gas (e.g. ammonia) or a dissociated nitrogenous salt (e.g. ammonia). It is not to be confused with techniques of coating molds with release agent coatings such as boron nitride (see for example U.S. Pat. No. 2,201,049 or British Pat. No. 544,512) which are totally different from the case hardening of the present invention.

Wheel 10 when treated with a liquid nitriding process as described hereinbefore performs significantly better than known wheels. For example, wheels made according to the present invention require cleaning only after 1½ to 2 hour intervals instead of the usual 20 minute intervals and have a life of about three weeks instead of the usual one week life. Increased life and reduced frequency of cleaning increase the fiberizing process yield as an additional advantage. These superior results are achieved over known wheels including stainless steel coated wheels. Moreover, liquid nitriding the operative surface according to the present invention obviates the need for stainless steel coatings.

The advantages of the present invention, as well as certain changes and modifications of the disclosed embodiment thereof, will be readily apparent to those skilled in the art. It is the applicant's intention to cover by his claims all those changes and modifications which could be made to the embodiment of the invention herein chosen for the purposes of the disclosure without departing from the spirit and scope of the invention.

What is claimed is:

1. In a metal wheel for use in mineral fiberizing processes of the type in which molten mineral is introduced onto the operative surface of the wheel and thereafter tangentially discharged therefrom the improvement comprising said operative surface being nitrided.

2. A wheel according to claim 1, wherein said surface is concave and further comprising means enclosed at least in part by said surface for cooling said surface.

3. In a process for fiberizing molten mineral of the type in which molten mineral is introduced onto an operative surface of a rotating metal wheel, tangentially released therefrom in streams, and thereafter contacted by streams of gaseous fluid operative to suddenly and violently change the direction of the mineral streams, the improvement which comprises said operative surface having been nitrided.

* * * * *